United States Patent
Lin

(10) Patent No.: US 10,776,264 B2
(45) Date of Patent: Sep. 15, 2020

(54) DATA STORAGE DEVICE WITH POWER RECOVERY PROCEDURE AND METHOD FOR OPERATING NON-VOLATILE MEMORY

(71) Applicant: Silicon Motion, Inc., Jhubei, Hsinchu County (TW)

(72) Inventor: Wen-Sheng Lin, Kaohsiung (TW)

(73) Assignee: SILICON MOTION, INC., Jhubei, Hsinchu County (TW)

(*) Notice: Subject to any disclaimer, the term of this patent is extended or adjusted under 35 U.S.C. 154(b) by 0 days.

(21) Appl. No.: 16/229,122

(22) Filed: Dec. 21, 2018

(65) Prior Publication Data
US 2019/0205247 A1 Jul. 4, 2019

(30) Foreign Application Priority Data

Dec. 28, 2017 (TW) .............................. 106146236 A

(51) Int. Cl.
*G06F 12/02* (2006.01)
*G06F 3/06* (2006.01)
*G06F 11/14* (2006.01)

(52) U.S. Cl.
CPC ........ *G06F 12/0246* (2013.01); *G06F 3/0604* (2013.01); *G06F 3/065* (2013.01); *G06F 3/0679* (2013.01); *G06F 11/14* (2013.01)

(58) Field of Classification Search
CPC .................................................. G06F 12/0246
See application file for complete search history.

(56) References Cited

U.S. PATENT DOCUMENTS

| | | |
|---|---|---|
| 2008/0228995 A1 | 9/2008 | Tan et al. |
| 2010/0042773 A1 | 2/2010 | Yeh |
| 2011/0131365 A1* | 6/2011 | Zhang ................. G06F 11/1441 711/103 |
| 2014/0006688 A1 | 1/2014 | Yu et al. |
| 2014/0075095 A1* | 3/2014 | Manohar ............. G06F 12/0246 711/103 |
| 2015/0006939 A1* | 1/2015 | Lim ....................... G11C 5/148 713/324 |
| 2016/0124820 A1 | 5/2016 | Lin |
| 2018/0302104 A1* | 10/2018 | Bhatia ................. G06F 11/1072 |

FOREIGN PATENT DOCUMENTS

| | | |
|---|---|---|
| TW | 200715114 A | 4/2007 |
| TW | 201635085 A | 10/2016 |

* cited by examiner

*Primary Examiner* — Edan Orgad
*Assistant Examiner* — Won Tae C Kim
(74) *Attorney, Agent, or Firm* — McClure, Qualey & Rodack, LLP

(57) ABSTRACT

A power recovery technique for a data storage device having a non-volatile memory and a control unit is provided. When the data storage device regains power, the control unit writes dummy data to the nonvolatile memory, starting from the next page of a final page indicated by a final page indicator until the first word line group is finished. The first word line group contains an empty page indicated by an empty page indicator. In this manner, user data is protected from being written to an unreliable area.

19 Claims, 7 Drawing Sheets

DATA STORAGE DEVICE WITH POWER RECOVERY PROCEDURE AND METHOD FOR OPERATING NON-VOLATILE MEMORY

CROSS REFERENCE TO RELATED APPLICATIONS

This Application claims priority of Taiwan Patent Application No. 106146236, filed on Dec. 28, 2017, the entirety of which is incorporated by reference herein.

BACKGROUND OF THE INVENTION

Field of the Invention

The present invention relates to data storage devices and methods for operating non-volatile memory.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on.

Write operations on a non-volatile memory may be interrupted by sudden power-off events. In order to guarantee data reliability, the power recovery procedure for a data storage device is important in the technical field.

BRIEF SUMMARY OF THE INVENTION

A data storage device in accordance with an exemplary embodiment of the present invention has a non-volatile memory and a control unit. The control unit writes dummy data to the non-volatile memory in a power recovery procedure. The writing of the dummy data is based on a final page indicator and an empty page indicator. The final page indicator indicates a final page on an active block of the non-volatile memory. The empty page indicator indicates an empty page that is located in a first word line group. Starting from a subsequent page following the final page, the control unit writes the dummy data until the first word line group is finished. In this manner, user data is protected from being written to an unreliable area.

A data storage device in accordance with another exemplary embodiment of the present invention has a non-volatile memory and a control unit. The control unit determines whether an alternate active block exists in a power recovery procedure. The control unit writes dummy data to the non-volatile memory according to a final page indicator of an active block and an empty page indicator when no alternate active block exists, wherein, at this moment, the final page indicator of the active block indicates a final page on the active block, the empty page indicator indicates an empty page that is located in a first word line group. The control unit writes the dummy data starting from a subsequent page following the final page until the first word line group is finished. When the alternate active block exists, the control unit moves user data, obtained according to a final page indicator of the alternate active block, from the alternate active block to a newly-allocated alternate active block. The alternate active block is allocated when writing the active block is finished. In spare time intervals between operations of the alternate active block, the control unit seals the mapping information of the active block.

In another exemplary embodiment, an operating method for a non-volatile memory is disclosed, which includes the following steps: determining whether an alternate active block exists in a power recovery procedure; writing dummy data to the non-volatile memory according to a final page indicator of an active block and an empty page indicator when no alternate active block exists, wherein, at this moment, the final page indicator of the active block indicates a final page on the active block of the non-volatile memory, the empty page indicator indicates an empty page that is located in a first word line group, and the writing of the dummy data starts from a subsequent page following the final page until the first word line group is finished; and when the alternate active block exists, moving user data, obtained according to a final page indicator of the alternate active block, from the alternate active block to a newly-allocated alternate active block. The alternate active block is allocated when writing the active block is finished. In spare time intervals between operations of the alternate active block, mapping information of the active block is sealed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
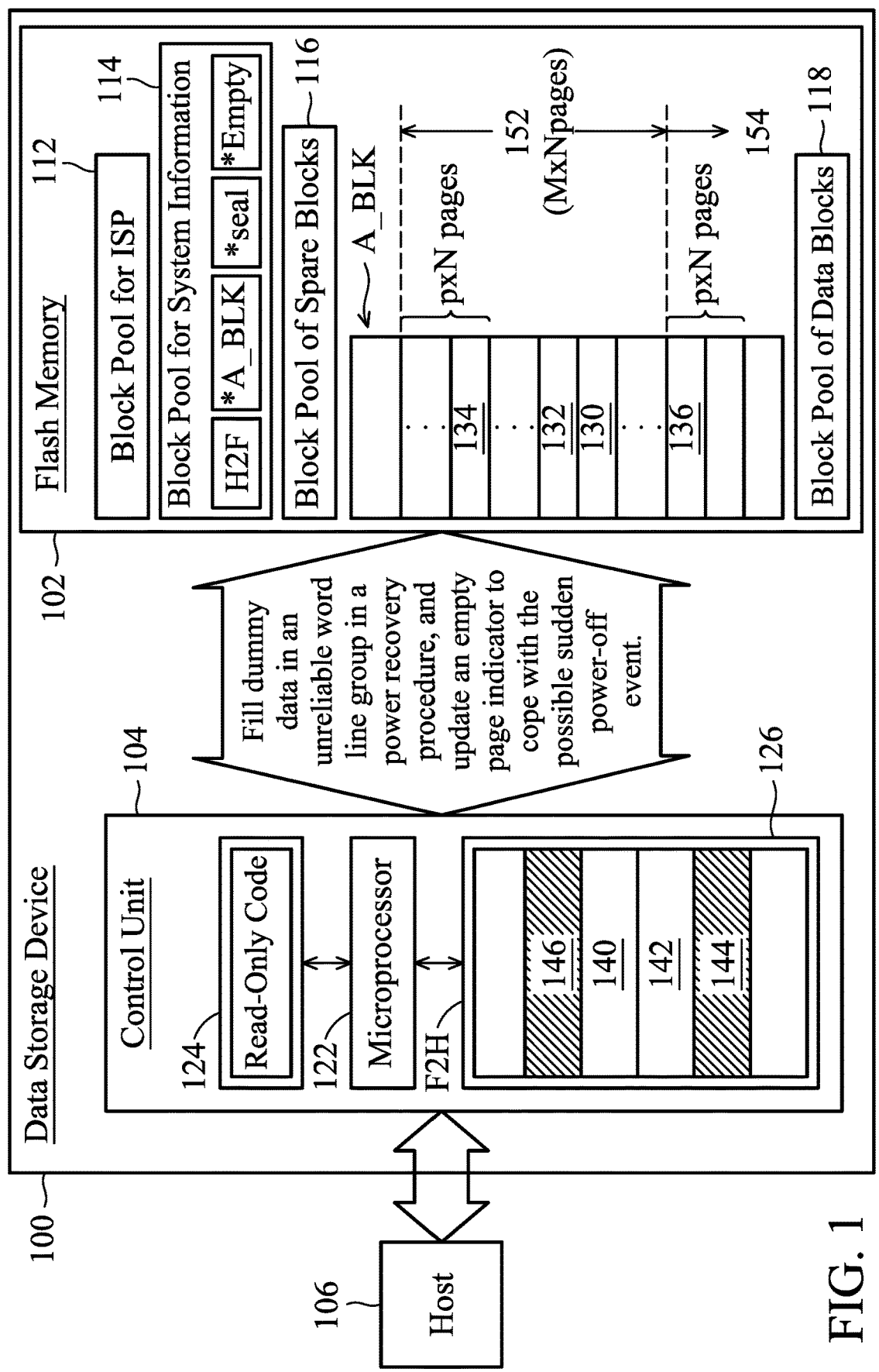
FIG. 1 is a block diagram illustrating a data storage device 100 in accordance with an exemplary embodiment of the present invention, which includes a flash memory 102 and a control unit 104.

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion is regarding flash memory in particular as an example.

A flash memory is often used as a storage medium in today's data storage devices, for implementations of a memory card, a USB flash device, an SSD and so on. In another exemplary embodiment, a flash memory is packaged with a controller to form a multiple-chip package and named eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with flash memories as the storage medium. For example, a server may operate an array of SSDs to form a data center. The server may be regarded as a host that operates the SSDs to access the flash memories within the SSDs.

The host distinguishes the flash memory storage contents by logical addresses (for example, according to a logical block address LBA or a global host page number GHP, etc.). The physical space of a flash memory is divided into a plurality of blocks, storing pages of data received from the host. In order to optimize the storage of the flash memory, the physical space of the flash memory is dynamically allocated to correspond to the host-identified logical addresses. The mapping between logical addresses and storage space needs to be properly managed.

Various operations of flash memory need to refer to or may change the mapping information. For example, the reading of flash memory needs to refer to the mapping information, and the writing of flash memory needs to update the mapping information. To reuse a storage space of a flash memory, the dirty space has to be erased in block units. Since there is an upper limit for the erasures that each block can withstand, the issue of wear leveling needs to be considered in flash memory operations. In addition, data updating is not rewriting the same space. The newer version of data is written to a spare space and the old data is regarded as invalid. A block may sporadically retain valid data, so the demand for garbage collection is correspondingly generated. Sporadic valid data retained by a block is moved to a spare space by garbage collection. The block with only invalid data left can be erased and released as a spare block waiting to be reused. The techniques of wearing leveling and garbage collection involve mapping information management. The management of mapping information is an important issue in the technical field.

There are many ways to manage mapping information. For an active block (currently used in the reception of data from the host, or as the destination block for garbage collection), the dynamically-changed mapping information may be managed by a mapping table F2H. The mapping table F2H is indexed along physical addresses to list the corresponding logical addresses. The mapping table F2H needs to be reversed for updating another mapping table H2F. The mapping table H2F provides a mapping information query mechanism with logical addresses as the searching index. The mapping table H2F needs to be backed up in a non-volatile manner (e.g. on the flash memory); that is, the mapping information of the small table F2H needs to be sealed to the large table H2F. The mapping table F2H may be also stored in the flash memory for the subsequent garbage collection operations to determine whether the data pages are valid or invalid. In particular, the logical address corresponding to each page of data may be recorded as metadata for each page. In cases where the mapping table F2H fails to be sealed to the mapping table H2F due to a sudden power-off event, the mapping information is rebuilt by the scanning of the metadata.

In the prevent invention, the flash memory is implemented by a high-density storage technology such as using multi-level cells (MLCs) or triple-level cells (TLCs) to store data. The storage density of each storage unit, therefore, is increased. Compared to a single-level cell (SLC), twice amount of data is stored in an MLC, and three times of data is stored in a TLC. According to the present invention, the high-density storage device may be programmed according to a one-shot programming technique. Multiple pages sharing the same storage unit are programmed together using one-shot programming. A flash memory may be read/write in a single-plane mode, double-plane mode or a mode associated with the parallel operations on more planes. According to the mode setting, the number of planes tied to the same read/write operation is determined, which may be just one single plane, two planes, or more than two planes. N pages are programmed together using one-shot programming, wherein N is an integer greater than 1 and may be the product of Level# (the number of data pages sharing the same storage unit) and Plane# (the number of planes depending on the mode setting); that is, N=Level#*Plane#. A 3D MLC flash memory is discussed as an example. Each storage unit is allocated to store two pages of data. When writing data in a double-plane mode, the value of N is 4 (=2×2). In another exemplary embodiment, a multi-chip enabling function is adopted. The number of storage areas accessed in an interleaving way according to a chip enable signal (CE signal) is CE#. The value of N may be Level#*Plane#*CE#. When a round of one-shot programming is interrupted by a sudden power-off event, the programmed data may have errors or be unreliable. The reliability of the adjacent data may be affected. For example, the data that can be correctly read at the moment of power recovery may degrade to unreadable in the near future. The space affected by a sudden power-off event may cover a word line group (involving M rounds of one-shot programming, including M*N pages). The reliability of the M*N pages of data has to be considered in the power recovery process.

FIG. 1 is a block diagram illustrating a data storage device 100 in accordance with an exemplary embodiment of the present invention, which includes a flash memory 102 and a control unit 104. The control unit 104 operates the flash memory 102 to respond to the requests from a host 106. The storage space of the flash memory 102 may be allocated for various purposes. A block pool 112 stores in-system code (ISP). A block pool 114 stores system information. An active block A_BLK is selected from a block pool 116 of spare blocks. The active block A_BLK may be utilized to receive data in response to write requests from the host 106 or as a destination block of garbage collection. The active block A_BLK is programmed using one-shot programming. In cases where the flash memory 102 stores data by SLCs and is operated in a double-plane mode, two pages are programmed to the active block A_BLK together corresponding to each one-shot programming operation. In cases where the flash memory 102 stores data by MLCs and is operated in a 1-plane mode, two pages are programmed to the active block A_BLK together in each one-shot programming operation. In cases where the flash memory 102 stores data by MLCs and is operated in a double-plane mode, four pages are programmed to the active block A_BLK together in each one-shot programming operation. In cases where the flash memory 102 stores data by TLCs and is operated in a 1-plane mode, three pages are programmed to the active block A_BLK together in each one-shot programming operation. In cases where the flash memory 102 stores data by TLCs and is operated in a double-plane mode, six pages are programmed to the active block A_BLK together in each one-shot programming operation. The active block A_BLK is pushed to a block pool 118 of data blocks when finishing the data reception. The block pool 114 of system information may store a mapping table H2F, and an indicator *A_BLK indicating the physical space of the active block A_BLK.

The control unit 104 includes a microprocessor 122, a read-only memory 124, and a volatile memory 126. The read-only memory 124 and the volatile memory 126 may be integrated with the microprocessor 122 or externally connected to the microprocessor 122. The read-only memory 124 stores read-only code. The microprocessor 122 may operate the flash memory 102 according to the read-only code contained in the read-only memory 124 and the in-system code contained in the ISP block pool 112. When operating the flash memory 102, the microprocessor 122 may dynamically manage a mapping table F2H of the active block A_BLK in the volatile memory 126. Considering the limited space of the volatile memory 126, the mapping table F2H may be quantitatively sealed to the mapping table H2F. In an exemplary embodiment, the partial sealing from the mapping table F2H to the flash memory 102 is also performed according to the reception of a power-off notification (PON). In an exemplary embodiment, the partial sealing from the mapping table F2H to the flash memory 102 is also required when rebuilding the mapping table F2H in a power recovery procedure (SPOR). The progress of sealing the mapping table F2H to the mapping table H2F may be recorded in the system information block pool 114 as system information (e.g., indicated by a indicator *seal). When a sudden power-off event occurs, the dynamically managed mapping information not updated to the volatile memory 126 yet lost. The control unit 104 of the present invention performs a power recovery procedure to deal with this problem, by which the mapping information is collected and the movement of unreliable data is performed.

The programming size (e.g. N pages) of each round of one-shot programming is considered in the power recovery procedure for adjusting the final page indicator of the active block A_BLK. The movement of unreliable data performed in the power recovery procedure specifically prevents from moving data to a word line group that might be affected by the sudden power-off event.

Referring to FIG. 1, when the power recovery procedure starts, the control unit 104 checks the system information block pool 114 to get the indicators *A_BLK and *seal. Accordingly, the active block A_BLK interrupted by the sudden power-off event is find out, and the progress of sealing the mapping table F2H of the active block A_BLK to the mapping table H2F is obtained. From the point indicated by the indicator *seal, the control unit 104 starts scanning the metadata of the active block A_BLK. In the order that the active block A_BLK was programmed, the logical addresses of the data stored in the different pages of the active block A_BLK are obtained. The mapping information that was not sealed to the mapping table H2F prior to the sudden power-off event but scanned now is collected to the volatile memory 126 to rebuild the mapping table F2H. When scanning to a space without any metadata, an empty page is found (130 in the figure). The control unit 104 stores the empty page indicator *Empty in the block pool 114 as system information. In an exemplary embodiment, a summary table is managed in the block pool 114 as a record of system information that includes the empty page indicator *Empty. The control unit 104 may initialize a final page indicator of the active block A_BLK to point to the former page 132 of the empty page 130. The control unit 104 checks whether the page 132 indicated by the final page indicator is the final page among the N pages written in one round of one-shot programming. In this example, page 132 is not a final page among N pages written in one round of one-shot programming. Thus, the control unit 104 searches back through the active block A_BLK to find the N pages of the former round of one-shot programming and corrects the final page indicator to point to page 134, the final page of the former round of one-shot programming. As for the mapping information collected in the volatile memory 126 by the scanning step of the power recovery procedure, the control unit 104 discards the mapping information 140 of the pages from the next page of page 134 to the page 132.

One-shot programming of page 132 was apparently interrupted by a sudden power-off event. By correcting the final page indicator of the active block A_BLK to page 134, the pages which might be damaged due to the interrupted one-shot programming is regarded as invalid. As a result, data reliability is guaranteed.

After correcting the final page indicator to page 134, all N pages that are programmed together using one-shot programming containing the newly-recognized final page are checked and corrected. When any of the N pages fails error checking and correction (e.g., UECC occurs), it means that the N pages are affected by the sudden power-off event. The control unit 104 searches back through the active block A_BLK to find a former round of one-shot programming and corrects the final page indicator to point to the final page among the N pages of the former round of one-shot programming. The mapping information corresponding to the failed one-shot programming in the mapping table F2H is discarded.

In FIG. 1, the final page indicator of the active block A_BLK points to page 134. A word line group recognition is performed based on the empty page indicator *Empty. In FIG. 1, the empty page 130 indicated by the empty page indicator *Empty belongs to a word line group 152 that includes M*N pages (M is a numerical value). According to the final page indicator pointing to page 134, the control unit 104 determines that the recognized word line group 152 contains p*N pages (programmed by p rounds of one-shot programming) of unreliable data and the unreliable p*N pages need to be moved. According to the final page indicator that points to page 134, dummy data is filled in from the next page of page 134 to the final page of the word line group 152. In this manner, the remaining free space of the unreliable word line group 152 is skipped. After filling the dummy data to the word line group 152, the control unit 104 changes the empty page indicator *Empty to point to the first page 136 of the next word line group 154. The first p*N pages of the word line group 152 are copied to the next word line group 154 using p rounds of one-shot programming. The entire unreliable word line group 152 is not used. In particular, the update of the empty page indicator *Empty (changed from the empty page 130 to another empty page 136) has its special utility. Another sudden power-off event may occur after the dummy data is programmed to the word line group 152. The word line group 154 may be affected. According to the empty page indicator *Empty that has been corrected to point to page 136, the control unit 104 correctly determines that the unreliable area due the new sudden power-off event is the word line group 154 rather than the former word line group 152. Dummy data is programmed to the word line group 154 according to the power recovery procedure to avoid programming user data to the unreliable word line group 154.

Referring to the mapping table F2H, when the dummy data is written to the word line group 152, the mapping information 140 is updated and mapping information 142 is recorded. The mapping information 140 and 142 both indicate a particular value representing the dummy data. When the data movement from word line group 152 to word line group 154 is performed using p rounds of one-shot programming, the mapping information 144 is established to replace the mapping information 146.

Figure 2:
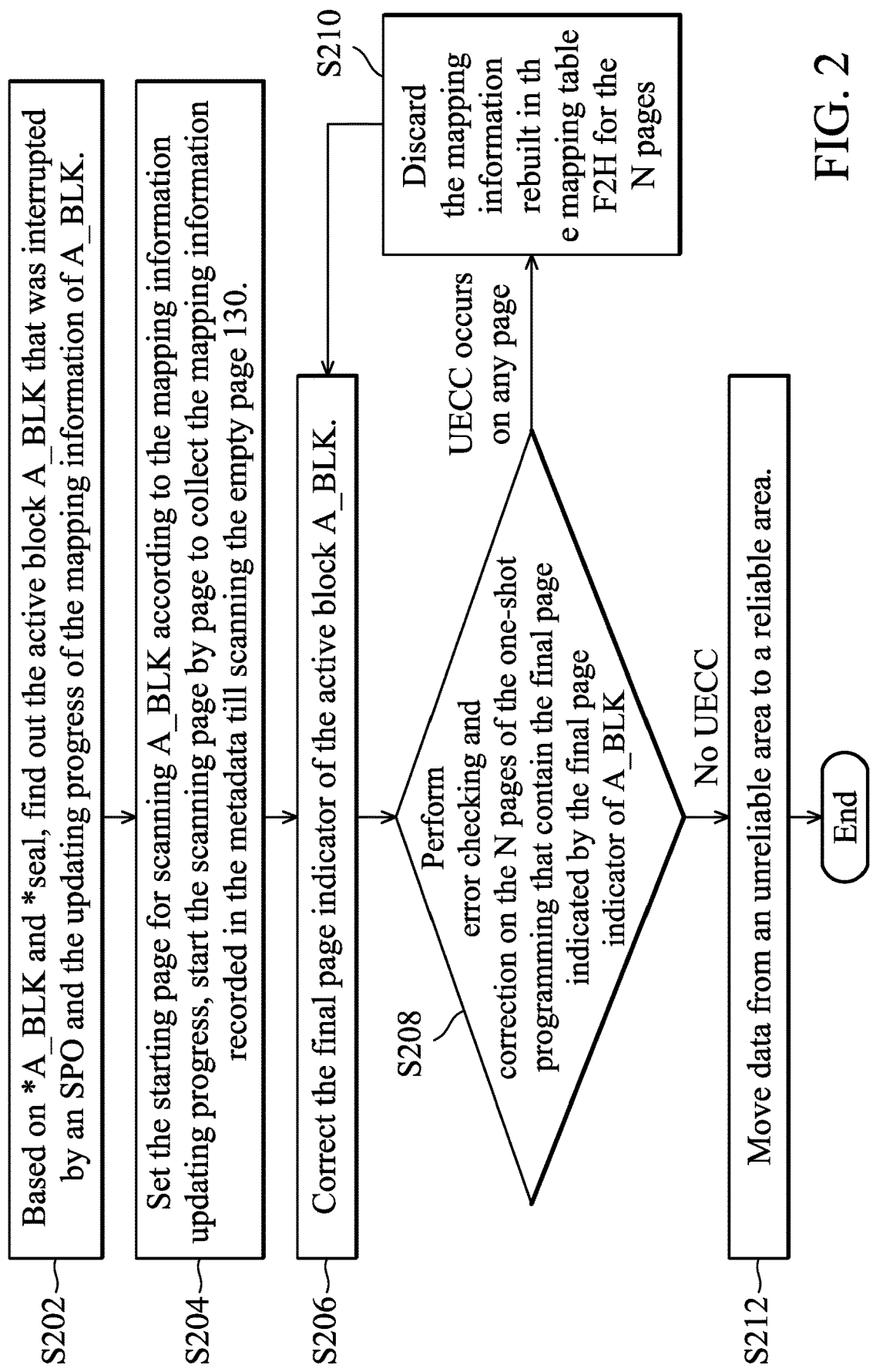
FIG. 2 is a flow chart illustrating a power recovery procedure implemented in accordance with an exemplary embodiment of the present invention.

FIG. 2 is a flow chart illustrating a power recovery procedure implemented in accordance with an exemplary embodiment of the present invention. The following is discussed with reference to FIG. 1. In step S202, the control unit 104 performs a power recovery procedure. Based on the indicator *A_BLK recorded in the system information block pool 114, the control unit 104 finds the active block A_BLK that was interrupted by a sudden power-off event. According to the indicator *seal contained in the system information block pool 114, the control unit 104 knows the updating progress of the mapping information of the active block A_BLK. In step S204, according to the mapping information updating progress, the control unit 104 sets the starting page for scanning the active block A_BLK, starts the scanning page by page to collect the mapping information (e.g. the logical address corresponding to each page) recorded in the metadata, and rebuilds the mapping table F2H of the active block A_BLK in the volatile memory 126. When scanning to the empty page 130 (containing no metadata), the control unit 104 proceeds to step S206. When the former page 132 of the empty page 130 is not the final page of one round of one-shot programming, the control unit 104 corrects the recognition of the final page of the active block A_BLK in step S206. The final page indicator of the active block A_BLK is corrected to point to the final page among the N pages of a former round of one-shot programming. In step S208, the control unit 104 performs error checking and correction on the N pages of one-shot programming that contain the final page indicated by the final page indicator of the active block A_BLK. When any page fails to pass the error checking and correction (for example, UECC occurs), the control unit 104 performs step S210 to discard the mapping information rebuilt in the mapping table F2H for the N pages, and performs step S206 again to search the active block A_BLK further back. The final page indicator of the active block A_BLK is moved forward to point to a final page among N pages of a former round of one-shot programming. When the error checking and correction of step S208 passes, the control unit 104 performs step S212 to move data from an unreliable area to a reliable area.

Figure 3:
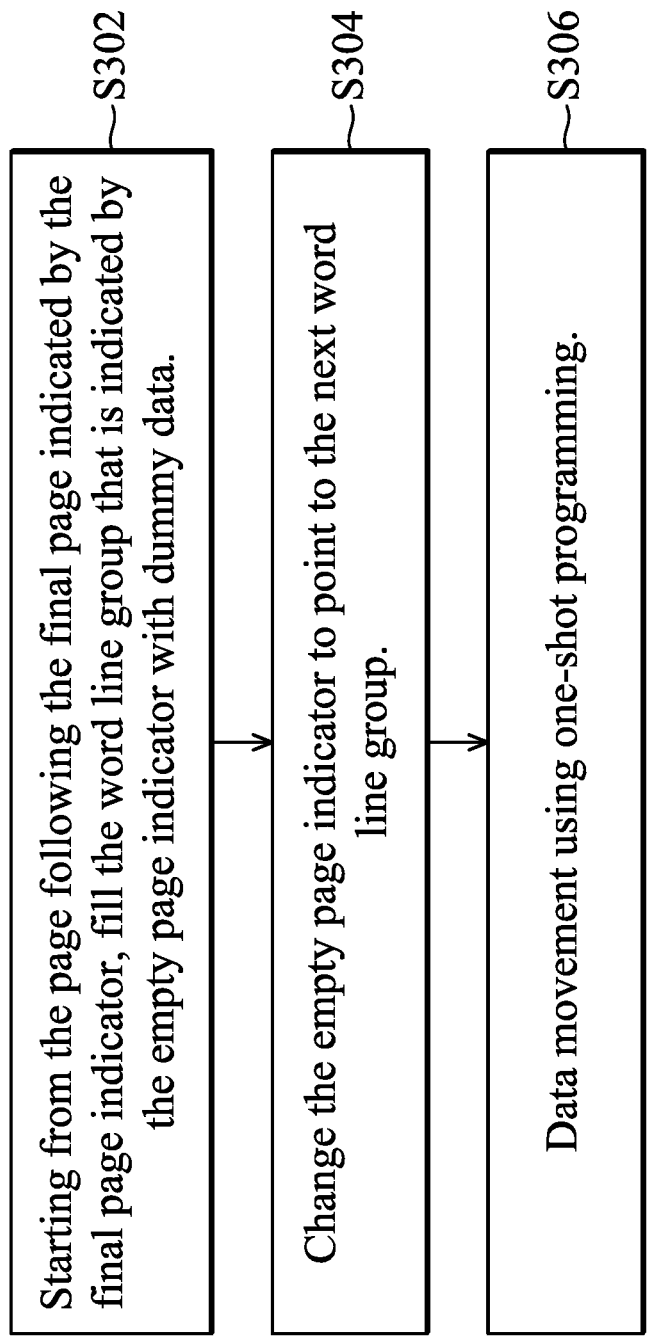
FIG. 3 is a flow chart illustrating the details of the data movement of step S212, which moves data to a reliable area in time.

FIG. 3 is a flow chart illustrating the details of the data movement of step S212, which moves data to a reliable area in time. In step S302, starting from the page following the final page 134 indicated by the final page indicator, the control unit 104 fills the word line group 152 indicated by the empty page indicator *Empty with dummy data. In step S304, the control unit 104 changes the empty page indicator *Empty to point to the first page 136 of the next word line group 154. In step S306, the p*N pages at the beginning of the word line group 152 with the page 134 as the final page are moved to the first p*N pages of the word line group 154 by the control unit 104. If the data movement of step S306 is interrupted by another sudden power-off event, the resumed control unit 104 can skip the steps of scanning, final page indicator correction, and the error checking and correction of FIG. 2. The steps of FIG. 3 are performed. Because the empty page indicator *Empty has been updated in the earlier power recovery procedure (changed by the earlier step S304 from pointing to page 130 to pointing to page 136), step S302, performed in the current power recovery procedure, programs dummy data to the correct area (i.e., the word line group 154 associated with the empty page indicated by the empty page indicator *Empty). User data, therefore, is protected from being written to an unreliable word line group (154).

Figure 4:
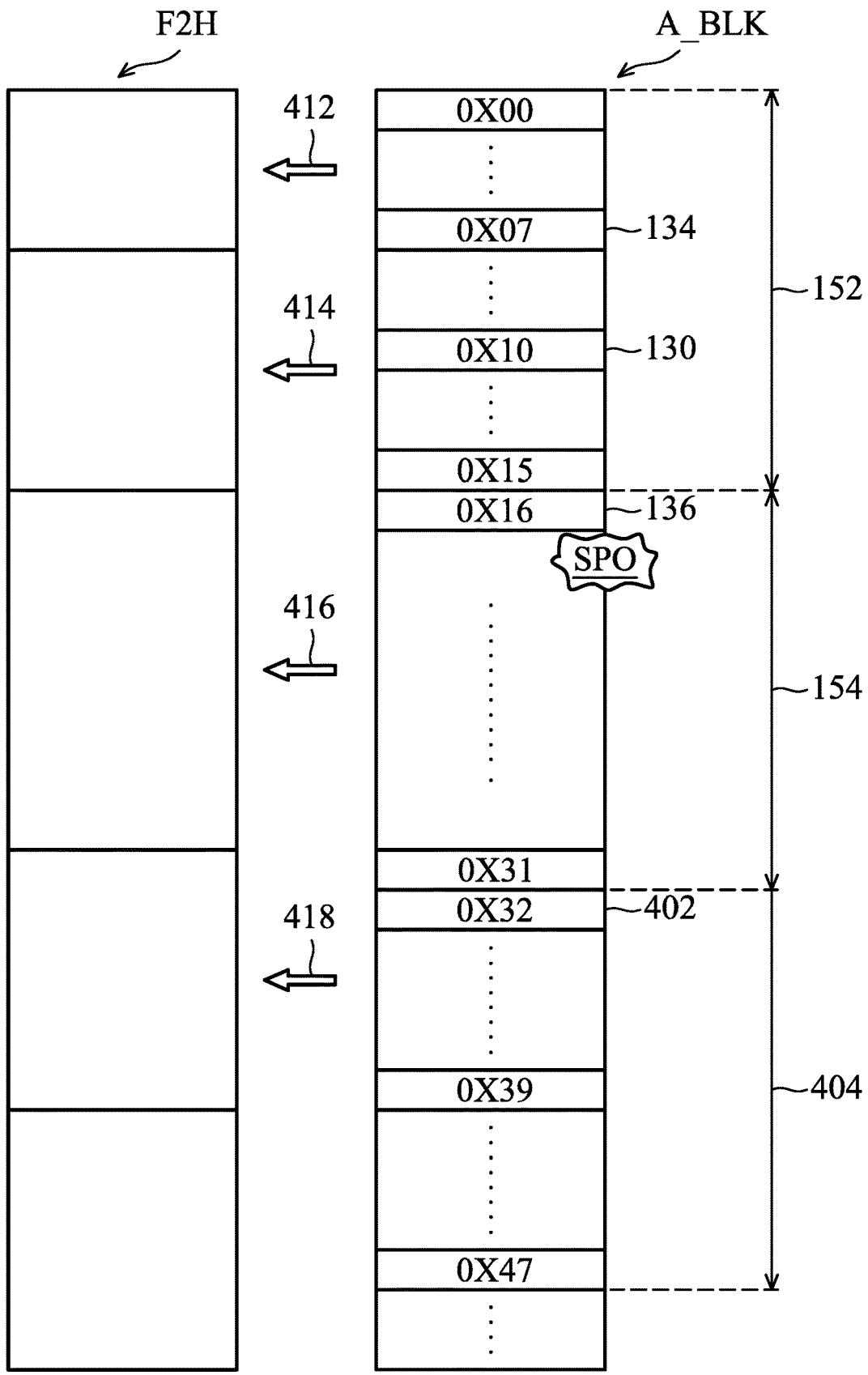
FIG. 4 depicts how to deal with a sudden power-off event that interrupted step S306.

FIG. 4 depicts how to deal with a sudden power-off event that interrupted step S306. Each round of one-shot programming is designed to program 4 pages of data at a time. The empty page 130 determined by the first power recovery procedure is at address 0x10, and the corrected final page indicator points to page 134 at address 0x07. The word line group 152 containing the empty page 130 includes 16 pages. From the next page (at address 0x08) of page 134 to the ending page (at address 0x15) of the word line group 152, dummy data is filled. After the programming of the dummy data, the empty page indicator *Empty is changed to point to page 136 (at address 0x16). Data movement for reliability enhancement starts in step S306, but another sudden power-off (SPO) event occurs. When being powered on again, the control unit 104 determines that the word line group 154 is unreliable because the page 136 (at address 0x16) indicated by the empty page indicator *Empty is contained in the word line group 154. The control unit 104 performs step S302 for dummy data programming, from the next page (at address 0x08) of the final page 134 indicated by the final page indicator to the ending page (at address 0x31) of the word line group 154. After the programming of the dummy data, the empty page indicator *Empty is changed to point to page 402 (at address 0x32) which is contained in another word line group 404 which is not affected by any sudden power-off event. The eight pages 0x00 to 0x07 associated with two rounds of one-shot programming are moved to the eight pages at 0x32-0x39 using two rounds of one-shot programming. The word line groups 152 and 154 affected by the sudden power-off events are not utilized to store user data.

The maintenance of the mapping table F2H is divided into several stages. The mapping data rebuilding 412 may be performed according to the scanning step S204. Corresponding to the dummy data programming step S302 that is repeated twice, mapping information is updated to the mapping table F2H as indicated by 414 and 416. The unreliable data movement performed by step S306 in the second power recovery procedure corresponds to the mapping information update 418.

Figure 5A:
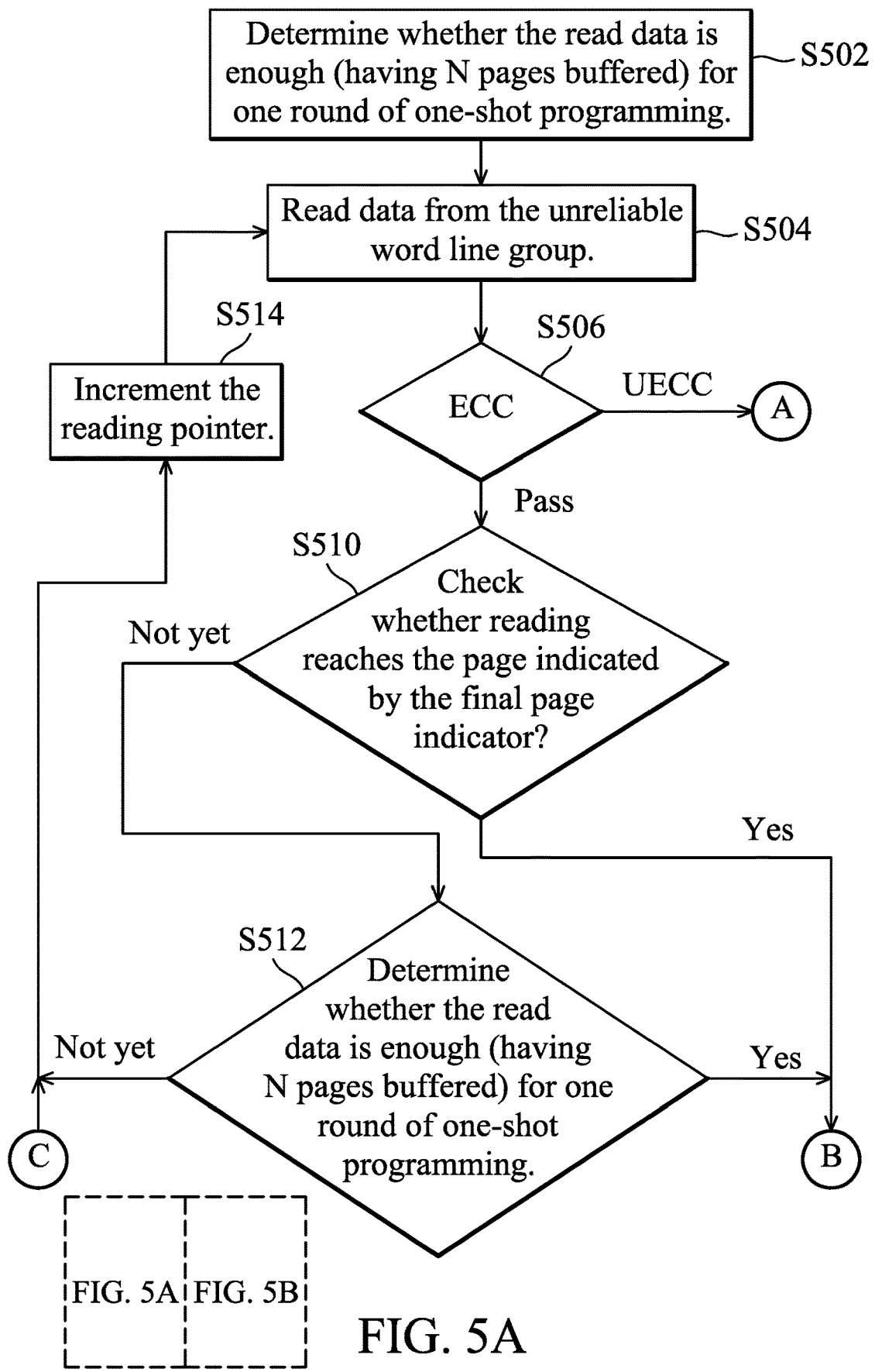
FIG. 5A and FIG. 5B show a flowchart depicting the details of the data movement step S306.
Figure 5B:
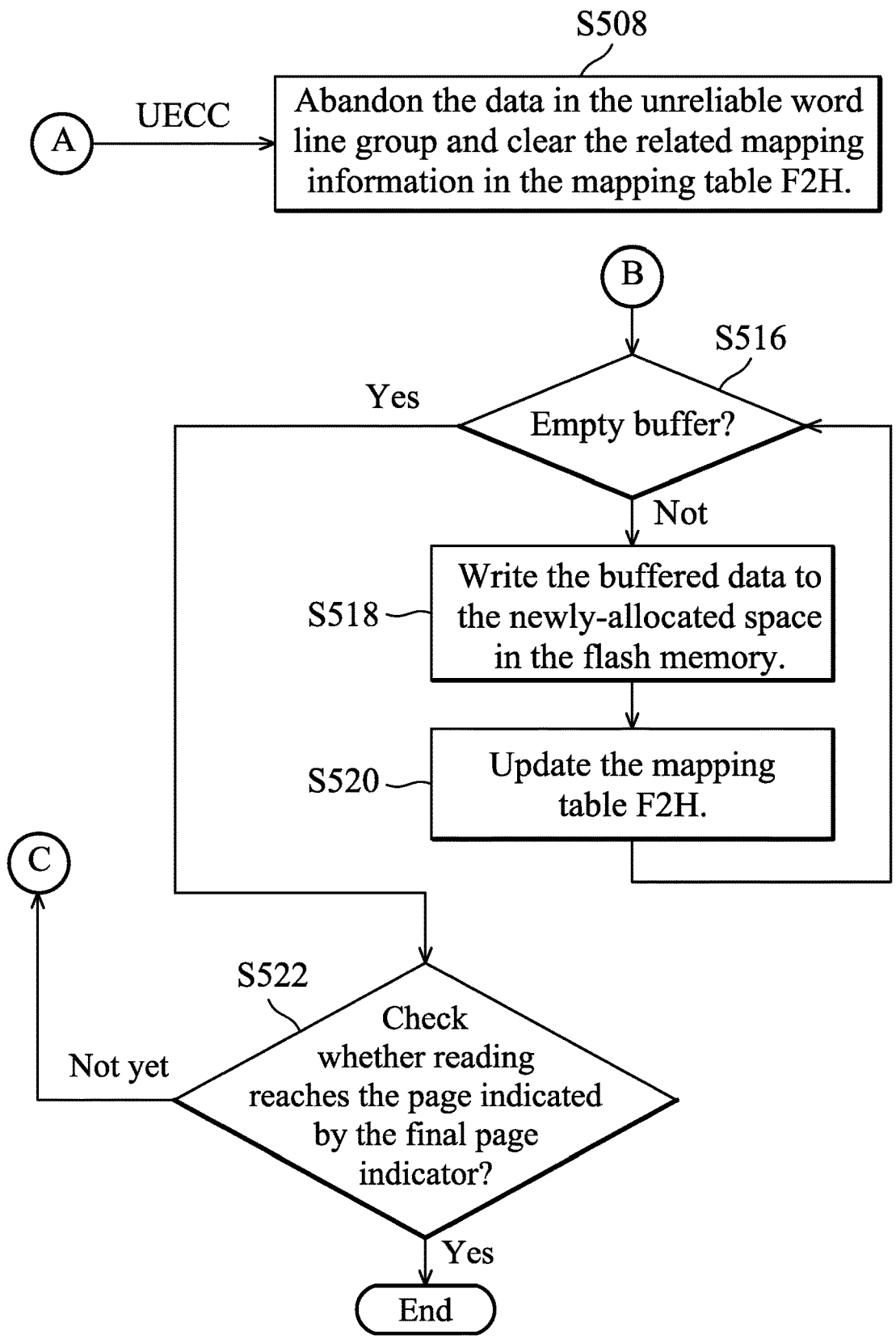

FIG. 5A and FIG. 5B show a flowchart depicting the details of the data movement step S306. Data movement is required and performed using one-shot programming. Data is confirmed again before being moved to a reliable region. The example of FIG. 4 is referenced in this paragraph. In step S502, the start point for data movement is determined. Because the final page indicator points to page 134 that is in the word line group 152, the data movement is set to start from page 0x00, the first page of the word line group 152. In step S504, data is read from the unreliable word line group 152. In an exemplary embodiment, data is read from the unreliable area page by page. The complete content of each page includes metadata, from which the error checking and correction code (e.g., ECC code) of each page is obtained. In step S506, error checking and correction is performed on each page of the read data. When the error checking and correction fails (for example, UECC occurs), step S508 is performed. The data in the word line group 152 is abandoned and the related mapping information (which was rebuilt on the volatile memory 126 by step 412) in the mapping table F2H is cleared. On the contrary, when the error checking and correction passes, step S510 is performed to check whether the reading step S504 read the page 134 indicated by the final page indicator. If not, step S512 is performed to determine whether the read data is enough (having N pages buffered) for one round of one-shot programming. If not, step S514 is performed to increment the reading pointer and steps S504 and S506 are performed again. If it is determined in step S512 that there are N pages buffered for one round of one-shot programming, step S516 is performed to confirm that the buffer is not empty, and step S518 is performed to write the buffered data (read by repeating the reading step S504) to the flash memory (e.g. writing the buffered data to the spare pages of the word line group 404). In step S520, the mapping table F2H on the volatile memory 126 is updated (referring to the update indicated by 418) according to the one-shot programming of step S518. Then, the buffer is cleared. Step S522 is performed to check whether the reading step S504 proceeds to the page 134 indicated by the final page indicator. If yes, the flow ends. If not, the flow proceeds to step S514.

In an exemplary embodiment, sequential data and random data are written to separate blocks, e.g., labeled C0 and C1, respectively. The control unit 104 repairs the data blocks C0 and C1 both during the power recovery procedure. In an exemplary embodiment, when finishing using the block C0/C1 to receive data, the control unit 104 allocates a new block (i.e. an alternate active block) C2/C3 to receive sequential/random data. The spare time intervals between the operations of block C2/C3 may be utilized to seal the mapping table F2H of the block C0/C1 to the mapping table H2F. When the control unit 104 determines from the system information of the block pool 114 that no block C2/C3 exists, the data movement that moves unreliable data (due to a sudden power-off event that interrupted the writing operation) to a reliable area is performed based on the steps of FIG. 3 which includes filling dummy data to the unreliable area. When block C2/C3 exists, the unreliable data is preserved in another way. Referring to the flow of FIG. 3, a large amount of mapping data should be rebuilt (not only including the mapping information of block C2/C3 and C0/C1 but also including the mapping information of the dummy data filled to the block C2/C3). Thus, the steps of FIG. 3 are not adopted here. Instead of filling dummy data to avoid using an unreliable area of the block C2/C3, the control unit 104 allocates a new block C4/C5 and copies the entire block C2/C3 to the new block C4/C5. No resources are wasted in maintaining the mapping information of dummy data.

Figure 6:
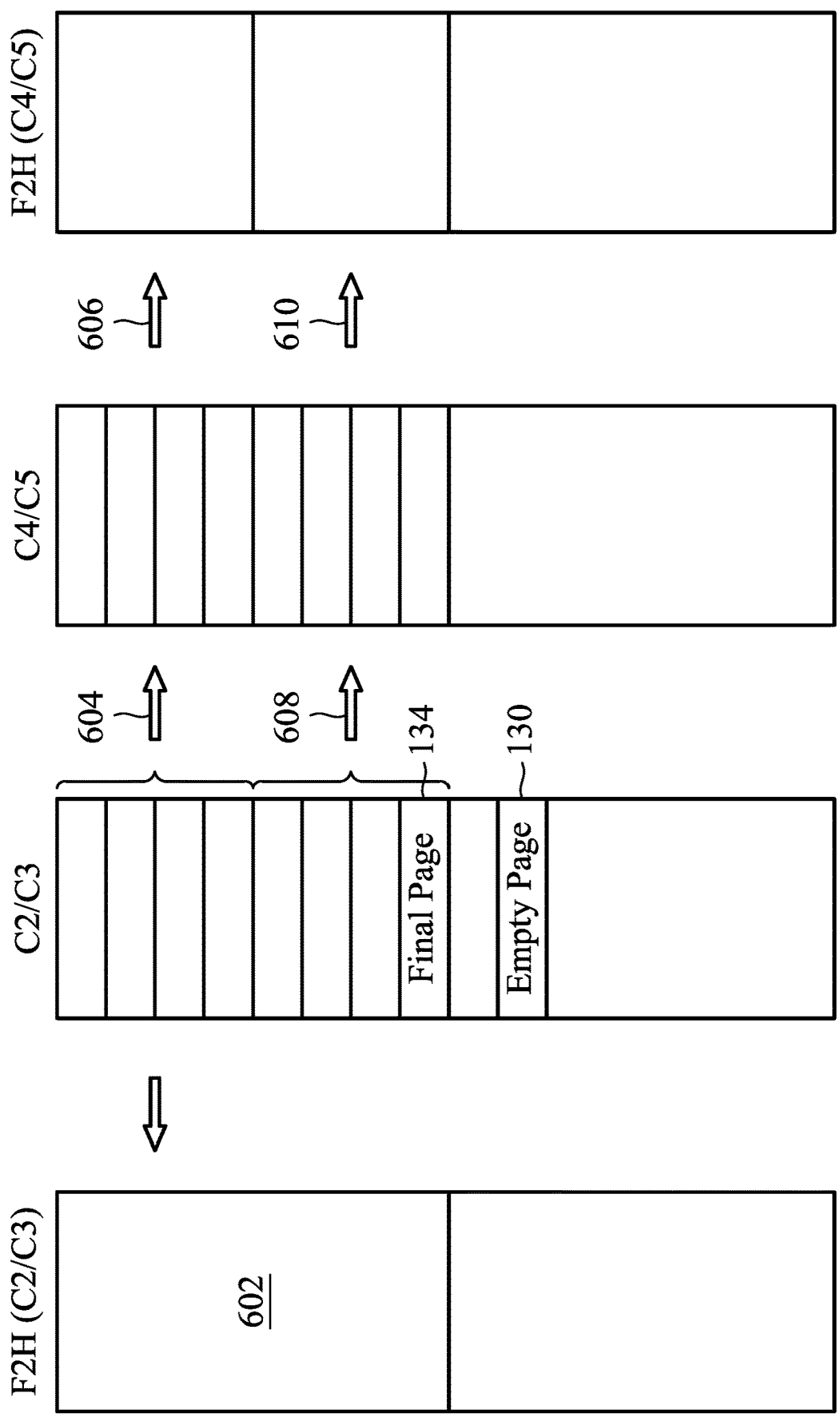
FIG. 6 illustrates data movement in a power recovery procedure that preserves unreliable data of block C2/C3.

FIG. 6 illustrates data movement in a power recovery procedure that preserves unreliable data of block C2/C3. The final page indicator 134 determined in the power recovery procedure points to page 134 and thereby the unreliable data on the block C2/C3 is obtained, corresponding to mapping information 602 rebuilt in the mapping table F2H. As shown, the control unit 104 allocates a new block (i.e., a newly-allocated alternate active block) C4/C5 in the power recovery procedure. The contents of block C2/C3 are moved to block C4/C5 using several rounds (e.g. 604 and 608) of one-shot programming. N pages are programmed in each round of one-shot programming. According to the round of one-shot programming indicated by 604, the corresponding update, indicated by 606, of mapping information is made on the volatile memory 126 to build a mapping table F2H for the block C4/C5. According to the round of one-shot programming indicated by 608, the corresponding update, indicated by 610, of mapping information is made on the mapping table F2H of the block C4/C5 as shown. The data movement indicated by 604 and 608 that moves data from block C2/C3 to block C4/C5 and the corresponding mapping information update 608 and 610 may be implemented according to the steps of FIGS. 5A and 5B. One-shot programming is adopted. Before being copied to block C4/C5, data may be confirmed by error checking and correction.

Solutions implemented in power recovery for unreliable word line group are considered within the scope of the present invention. Based on the aforementioned technical content, the present invention further relates to a non-volatile memory operation method.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a control unit, writing dummy data to the non-volatile memory in a power recovery procedure corresponding to a sudden power-off event,
wherein:
the non-volatile memory is programmed using one-shot programming by which N pages are programmed in one round of one-shot programming and N is a number greater than one;
the control unit writes the dummy data to the non-volatile memory according to a final page indicator and an empty page indicator;
the final page indicator indicating a final page on an active block of the non-volatile memory is corrected by the control unit in the power recovery procedure to guarantee that the final page indicator points to a final page among N pages of one round of one-shot programming programmed prior to the sudden power-off event;
the empty page indicator indicates an empty page that is located in a first word line group; and
starting from a subsequent page following the final page indicated by the final page indicator which has been corrected in the power recovery procedure, the control unit writes the dummy data until the first word line group is finished.

2. The data storage device as claimed in claim 1, wherein:
after writing the dummy data to the non-volatile memory, the control unit updates the empty page indicator to point to a second word line group subsequent to the first word line group.

3. The data storage device as claimed in claim 2, wherein:
after updating the empty page indicator, the control unit moves user data, obtained according to the final page indicator, from the first word line group to the second word line group.

4. The data storage device as claimed in claim 3, wherein:
the control unit moves user data from the first word line group to the second word line group using one-shot programming.

5. The data storage device as claimed in claim 4, wherein:
the control unit performs error checking and correction on the user data expected to be moved and does not move the user data that fails the error checking and correction.

6. A data storage device, comprising:
a non-volatile memory; and
a control unit, determining whether an alternate active block exists in a power recovery procedure, the power recovery procedure corresponding to a sudden power-off event,
wherein:
the non-volatile memory is programmed using one-shot programming by which N pages are programmed in one round of one-shot programming and N is a number greater than one;
the control unit writes dummy data to the non-volatile memory according to a final page indicator of an active block and an empty page indicator when no alternate active block exists;
when no alternate active block exists, the final page indicator of the active block is corrected by the control unit in the power recovery procedure to guarantee that the final page indicator of the active block points to a final page among N pages of one round of one-shot programming programmed prior to the sudden power-off event, the empty page indicator indicates an empty page that is located in a first word line group, and the control unit writes the dummy data starting from a subsequent page following the final page indicated by the final page indicator which has been corrected in the power recovery procedure until the first word line group is finished;
when a first alternate active block, allocated due to finishing writing the active block, exists, the control unit further allocates a second alternate active block and moves user data, obtained according to a final page indicator of the first alternate active block, from the first alternate active block to the second alternate active block;
in spare time intervals between operations of the first alternate active block, the control unit seals mapping information of the active block.

7. The data storage device as claimed in claim 6, wherein:
the control unit corrects the final page indicator of the first alternate active block in the power recovery procedure to guarantee that the final page indicator of the first alternate active block points to a final page of N pages of one round of one-shot programming programmed prior to the sudden power-off event; and
the control unit moves user data from the first alternate active block to the second alternate active block using one-shot programming.

8. The data storage device as claimed in claim 7, wherein:
the control unit performs error checking and correction on the user data expected to be moved from the first alternate active block to the second alternate active block and, when the user data expected to be moved from the first alternate active block to the second alternate active block fails the error checking and correction, data movement is omitted.

9. The data storage device as claimed in claim 8, wherein:
after writing the dummy data to the non-volatile memory, the control unit updates the empty page indicator to point to a second word line group subsequent to the first word line group.

10. The data storage device as claimed in claim 9, wherein:
after updating the empty page indicator, the control unit moves user data, obtained according to the final page indicator of the active block, from the first word line group to the second word line group.

11. The data storage device as claimed in claim 10, wherein:
the control unit moves user data from the first word line group to the second word line group using one-shot programming.

12. The data storage device as claimed in claim 11, wherein:
the control unit performs error checking and correction on the user data expected to be moved from the first word line group to the second word line group and, when the user data expected to be moved from the first word line group to the second word line group fails the error checking and correction, data movement is omitted.

13. An operating method for a non-volatile memory, comprising:
programming the non-volatile memory by one-shot programming, wherein N pages are programmed in one round of one-shot programming and N is a number greater than one;
determining whether an alternate active block exists in a power recovery procedure, the power recovery procedure corresponding to a sudden power-off event;
writing dummy data to the non-volatile memory according to a final page indicator of an active block and an empty page indicator when no alternate active block exists;
when no alternate active block exists, the final page indicator of the active block is corrected in the power recovery procedure to guarantee that the final page indicator of the active block points to a final page among N pages of one round of one-shot programming programmed prior to the sudden power-off event, the empty page indicator indicates an empty page that is located in a first word line group, and the writing of the dummy data starts from a subsequent page following the final page indicated by the final page indicator which has been corrected in the power recovery procedure until the first word line group is finished; and
when a first alternate active block, allocated due to finishing writing the active block, exists, further allocating a second alternate active block and moving user data, obtained according to a final page indicator of the first alternate active block, from the first alternate active block to the second alternate active block,
wherein:
in spare time intervals between operations of the first alternate active block, mapping information of the active block is sealed.

14. The operating method as claimed in claim 13, wherein:
the final page indicator of the first alternate active block is corrected in the power recovery procedure and thereby guaranteed to point to a final page among N pages of one round of one-shot programming programmed prior to the sudden power-off event; and
user data is moved from the first alternate active block to the second alternate active block using one-shot programming.

15. The operating method as claimed in claim 14, further comprising:
performing error checking and correction on the user data expected to be moved from the first alternate active block to the second alternate active block and, when the user data expected to be moved from the first alternate active block to the second alternate active block fails the error checking and correction, data movement is omitted.

16. The operating method as claimed in claim 15, further comprising:
   after writing the dummy data to the non-volatile memory, updating the empty page indicator to point to a second word line group subsequent to the first word line group.

17. The operating method as claimed in claim 16, further comprising:
   after updating the empty page indicator, moving user data, obtained according to the final page indicator of the active block, from the first word line group to the second word line group.

18. The operating method as claimed in claim 17, wherein:
   user data is moved from the first word line group to the second word line group using one-shot programming.

19. The operating method as claimed in claim 18, further comprising:
   performing error checking and correction on the user data expected to be moved from the first word line group to the second word line group and, when the user data expected to be moved from the first word line group to the second word line group fails the error checking and correction, data movement is omitted.

\* \* \* \* \*